(12) United States Patent
Matsuo et al.

(10) Patent No.: US 9,962,685 B2
(45) Date of Patent: May 8, 2018

(54) CATALYST AND PROCESS FOR PRODUCING SAME

(71) Applicant: SANTOKU CORPORATION, Kobe-shi, Hyogo (JP)

(72) Inventors: Shinya Matsuo, Kobe (JP); Tadatoshi Murota, Kobe (JP)

(73) Assignee: SANTOKU CORPORATION, Kobe-shi, Hyogo (JP)

( * ) Notice: Subject to any disclaimer, the term of this patent is extended or adjusted under 35 U.S.C. 154(b) by 170 days.

(21) Appl. No.: 14/791,935

(22) Filed: Jul. 6, 2015

(65) Prior Publication Data

US 2015/0306577 A1 Oct. 29, 2015

Related U.S. Application Data

(63) Continuation of application No. 13/979,555, filed as application No. PCT/JP2011/065971 on Jul. 13, 2011, now abandoned.

(30) Foreign Application Priority Data

Jan. 14, 2011 (JP) ................... 2011-005936

(51) Int. Cl.
  *B01J 23/10* (2006.01)
  *B01J 23/89* (2006.01)
  (Continued)

(52) U.S. Cl.
  CPC ............ *B01J 23/894* (2013.01); *B01J 23/83* (2013.01); *B01J 35/002* (2013.01);
  (Continued)

(58) Field of Classification Search
  USPC ........................................ 502/304, 100, 300
  See application file for complete search history.

(56) References Cited

U.S. PATENT DOCUMENTS

| | | | |
|---|---|---|---|
| 6,133,194 A | 10/2000 | Cuif et al. | |
| 2004/0234438 A1* | 11/2004 | Dai ................. | B01D 53/94 423/263 |

(Continued)

FOREIGN PATENT DOCUMENTS

| | | |
|---|---|---|
| JP | 2001-524918 A | 12/2001 |
| JP | 2006-181473 A | 7/2006 |

(Continued)

OTHER PUBLICATIONS

International Searching Authority, International Preliminary Report on Patentability issued in corresponding International application No. PCT/JP2011/065971, dated Jul. 16, 2013.

(Continued)

*Primary Examiner* — James E McDonough
(74) *Attorney, Agent, or Firm* — Sughrue Mion, PLLC

(57) ABSTRACT

A catalyst, a hydrocarbon steam reforming catalyst, and a method for producing the same are provided. A catalytic metal containing at least Ni is supported on a composite oxide containing R, Zr, and oxygen, at a composition of not less than 10 mol % and not more than 90 mol % of R, not less than 10 mol % and not more than 90 mol % of Zr, and not less than 0 mol % and not more than 20 mol % of M (M: elements other than oxygen, R, and Zr), with respect to the total of the elements other than oxygen being 100 mol %, wherein the composite oxide has a specific surface area of 11 to 90 m$^2$/g, and the largest peak in the wavelength range of 200 to 800 cm$^{-1}$ of Raman spectrum with a full width at half maximum of 20 to 72 cm$^{-1}$.

5 Claims, 1 Drawing Sheet

(51) Int. Cl.
- *B01J 23/83* (2006.01)
- *B01J 35/00* (2006.01)
- *B01J 35/10* (2006.01)
- *C01B 3/40* (2006.01)
- *H01M 4/90* (2006.01)
- *B01J 35/02* (2006.01)
- *B01J 37/00* (2006.01)
- *B01J 37/02* (2006.01)
- *B01J 37/04* (2006.01)
- *B01J 37/08* (2006.01)
- *B01J 21/00* (2006.01)
- *B01J 23/00* (2006.01)
- *B01J 25/00* (2006.01)
- *B01J 29/00* (2006.01)
- *H01M 8/1018* (2016.01)
- *B01J 21/06* (2006.01)

(52) U.S. Cl.
CPC ......... *B01J 35/0006* (2013.01); *B01J 35/023* (2013.01); *B01J 35/1014* (2013.01); *B01J 37/0018* (2013.01); *B01J 37/0201* (2013.01); *B01J 37/04* (2013.01); *B01J 37/08* (2013.01); *C01B 3/40* (2013.01); *H01M 4/9041* (2013.01); *H01M 4/9066* (2013.01); *B01J 21/066* (2013.01); *C01B 2203/0233* (2013.01); *C01B 2203/1058* (2013.01); *C01B 2203/1082* (2013.01); *H01M 2008/1095* (2013.01); *Y02P 20/52* (2015.11)

(56) References Cited

U.S. PATENT DOCUMENTS

| | | | |
|---|---|---|---|
| 2006/0216227 A1* | 9/2006 | Idem | B01J 21/066 423/651 |
| 2008/0138272 A1* | 6/2008 | Ohmori | B01J 13/0047 423/622 |
| 2010/0303712 A1 | 12/2010 | Nagaoka et al. | |
| 2010/0329954 A1 | 12/2010 | Yokota et al. | |

FOREIGN PATENT DOCUMENTS

| | | |
|---|---|---|
| JP | 2008-150237 A | 7/2008 |
| JP | 2008-229604 A | 10/2008 |
| JP | 2010-530343 A | 9/2010 |

OTHER PUBLICATIONS

Jixiang Chen, et al., Effect of preparation methods on structure and performance of Ni/Ce0.75Zr0.25O2 catalysts for CH4-CO2 reforming, Fuel, Oct. 2008, pp. 2901-2907, vol. 87, Issues 13-14.

Lei Cao, et al., "Autothermal reforming of methane over Rh/Ce0.5Zr0.5O2 catalyst: Effects of the crystal structure of the supports", Fuel Processing Technology, Mar. 2010, pp. 306-312, vol. 91, Issue 3.

Lei Cao, et al., "Correlation between catalytic selectivity and oxygen storage capacity in autothermal reforming of methane overRh/Ce0.45Zr0.45RE0.1 catalysts (RE=La, Pr, Nd, Sm, Eu, Gd, Tb)", Catalysis Communications, Mar. 30, 2009, pp. 1192-1195, vol. 10, Issue 8.

Muramoto et al., "Development of Steam Reforming Catalyst for Hydrogen Production," IHI Engineering Review, 2005, vol. 45, No. 3, pp. 116-120.

Shinya Matsuo, "Mysterious Phenomena Observed in Ionic Oxides of Zr—Ce—Pr—O System", The 36th Symposium on Solid State Ionics in Japan, Extended Abstracts, The Solid State Ionics Society of Japan, Nov. 24-26, 2010, 4 pages.

Shinya Matsuo, "Sanka Seriumu Kanren Kagoubutsu no Fushigi na Miryoku (Mysterious Witchery of Cerium Oxide-Related Compounds)", 44th Basic Science Division Seminar, "Ima, Chumoku Sareru Ion Doudensei Kotai (Ion Conductive Solid Now Receiving Attention)", Abstracts for Meeting, The Ceramic Society of Japan, Division of Basic Science, Jul. 27, 2010, 7 pages.

Shinya Matsuo, et al., "Sanka Seriumu Kanren Kagoubutsu de Kousei suru Nano Kuukan no Fushigi na Miryoku (Mysterious Witchery of Nanospace Constituted by Cerium Oxide-Related Compounds)", 69th Committee on Materials Processing and Applications, Subcommittee 2 (Technologies Related to New Materials), The 64th Meeting Documents for Workshop, Japan Society for the Promotion of Science, Jul. 14, 2010, 8 pgs.

\* cited by examiner

US 9,962,685 B2

CATALYST AND PROCESS FOR PRODUCING SAME

CROSS REFERENCE TO RELATED APPLICATIONS

This application is a Continuation of U.S. application Ser. No. 13/979,555, filed Jul. 12, 2013, which is a National Stage of International Application No. PCT/JP2011/065971, filed on Jul. 13, 2011, which claims priority from Japanese Patent Application No. 2011-005936 filed on Jan. 14, 2011, the contents of all of which are incorporated herein by reference in their entirety.

FIELD OF ART

The present invention relates to a catalyst and a method for producing the same, in particular to a hydrocarbon steam reforming catalyst for hydrogen production.

BACKGROUND ART

Fuel cells with high energy conversion efficiency have recently been developed actively for the purpose of suppression of global warming. Polymer electrolyte fuel cells (PEFCs) are being put into practical household or vehicle uses. PEFCs generate electricity using hydrogen and atmospheric oxygen as fuels, and the hydrogen is produced by steam reforming of hydrocarbon such as in city gas. Efficient steam reforming requires a catalyst, and there have been proposed catalysts such as Ru supported on alumina (Non-patent Publication 1), Pt, Ru, Rh, Pd, and the like supported on an oxide solid solution of Zr, Ce, and Fe or Y (Patent Publication 1), and Pt, Rh, Ni, Co, and the like supported on an oxide containing Ce, Pr, and the like (Patent Publication 2).

These catalysts contain a large amount of precious metals, which adds to cost and uncertainty of supply. Oxidation of the catalysts significantly deteriorates the rate of reforming hydrocarbon to hydrogen, which complicates setting of handling and operating conditions.

High cost of Pt catalyst, which is used in both anode and cathode, obstructs popularization of PEFCs. Particularly a large amount of Pt catalyst is used in the oxygen reduction $1/2O_2+2H^++2e^-\rightarrow H_2O$ at cathode. In this regard, development of catalyst materials which can substitute or reduce the amount of Pt catalysts is being made actively.

As a catalyst for purifying exhaust gases used in vehicles or the like, so-called three-way catalyst is used, which oxidizes carbon monoxide and hydrocarbon in exhaust gases to carbon dioxide gas and water, while reduces nitrogen oxide to nitrogen and water. The three-way catalyst is composed, for example, of a catalytic metal, Pt, Rh, or Pd, and a co-catalyst, such as Ce, for improving the catalytic action of the catalytic metal, both supported on a catalyst support, such as alumina or cordierite. The precious metals used as such a catalytic metal have problems in cost and supply, as mentioned above.

PRIOR ART PUBLICATION

Patent Publication 1: JP-2006-181473-A
Patent Publication 2: JP-2008-229604-A
Non-patent Publication 1: IHI Engineering Review, Vol. 45, No. 3, p 116-120 (2005-9)

SUMMARY OF THE INVENTION

It is an object of the present invention to provide a catalyst that reduces problems of the above-mentioned catalysts in cost and supply, achieves a high rate of reforming hydrocarbon to hydrogen, is capable of increasing the rate of reforming hydrocarbon to hydrogen even when oxidized, and is easy to handle, as well as a hydrocarbon steam reforming catalyst and a method for producing the same.

Aiming to solve the above-mentioned problems, the present inventors have found out that a catalyst wherein at least Ni is supported on a composite oxide containing at least Ce and Zr and having particular crystallinity and specific surface area, is capable of reforming hydrocarbon to hydrogen at a high rate even when the catalyst does not contain or contains only a little, if any, precious metals, such as Ru, Pt, Rh, and Pd, and is capable of maintaining the high reforming rate even when oxidized, to thereby complete the present invention.

According to the present invention, there is provided a catalyst and a hydrocarbon steam reforming catalyst comprising a catalytic metal comprising at least Ni, supported on a composite oxide, wherein said composite oxide comprises R (R stands for Ce or a mixture of Ce and Pr), Zr, and oxygen, at a composition of not less than 10 mol % and not more than 90 mol % of R, not less than 10 mol % and not more than 90 mol % of Zr, and not less than 0 mol % and not more than 20 mol % of M (M stands for elements other than oxygen, R, and Zr), with respect to a total of said elements other than oxygen being 100 mol %, wherein said composite oxide has a specific surface area of 11 to 90 m²/g, and a largest peak in the wavelength range of 200 to 800 $cm^{-1}$ of Raman spectrum with a full width at half maximum of 20 to 72 $cm^{-1}$.

According to the present invention, there is also provided a method for producing the above-mentioned catalyst comprising:

(a) preparing a mixed solution of a cerium solution not less than 80 mol % of which cerium ions are tetravalent, and zirconium hydroxide, (b) neutralizing said mixed solution to obtain a precursor of a composite oxide, (c) adding a surfactant to said precursor and mixing, (d) calcining said precursor mixed with the surfactant to obtain a composite oxide, and (e) making said composite oxide support a catalytic metal comprising at least Ni.

EFFECT OF THE INVENTION

The catalyst according to the present invention is of low cost, free of uncertainty in supply, capable of reforming hydrocarbon to hydrogen at a high rate, and in particular, capable of maintaining a high reforming rate even when oxidized, and accordingly useful as a hydrocarbon steam reforming catalyst. The method according to the present invention allows efficient production of the catalyst of the present invention.

The catalyst of the present invention, of which composite oxide has the specific surface area of 20 to 40 m²/g and the largest peak in the wavelength range of 200 to 800 $cm^{-1}$ of Raman spectrum with a full width at half maximum of 30 to 45 $cm^{-1}$, is capable of consistently maintaining oxidation catalytic capacity under an oxidative atmosphere even when its catalytic metal does not include or include only a limited amount of precious metals. The catalyst according to the present invention, wherein at least Ni is supported as a catalytic metal, usually fails to exhibit catalyst characteristics under an oxidative atmosphere since Ni is oxidized into NiO. However, due to the composite oxide having the particular specific surface area and full width at half maximum, the catalyst characteristics that have never been achieved with the prior art are exhibited. Thus the catalyst according to the present invention having such a structure is capable of maintaining the function as a hydrocarbon steam reforming catalyst without reduction treatment.

PREFERRED EMBODIMENTS OF THE INVENTION

Figure 1:
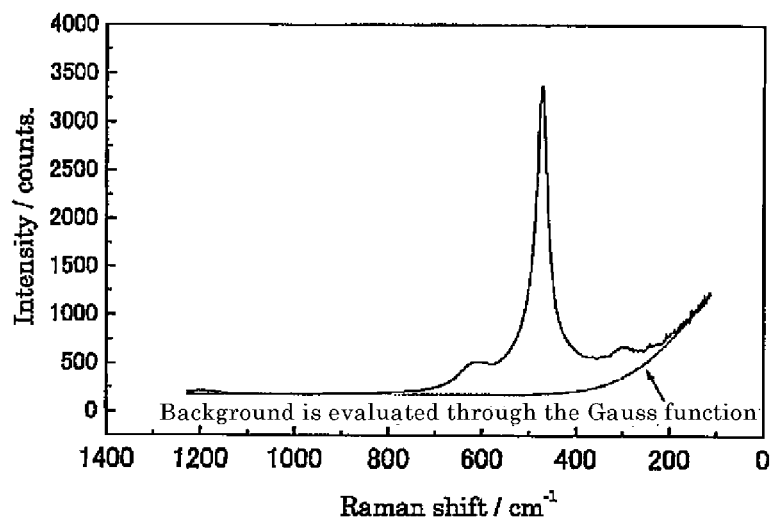
FIG. 1 is a graph showing the evaluation of the background, through the Gauss function, of the Raman scattering spectrum of the composite oxide prepared in Example 2.

The present invention will now be explained in detail.

The catalyst according to the present invention has a catalytic metal containing at least Ni, supported on a composite oxide of a particular composition containing Ce and Zr, or containing Ce, Pr and Zr.

The composite oxide used in the present invention contains not less than 10 mol % and not more than 90 mol % of R (R stands for Ce or a mixture of Ce and Pr), not less than 10 mol % and not more than 90 mol % of Zr, and not less than 0 mol % and not more than 20 mol % of M (M stands for elements other than oxygen, R, and Zr), with respect to the total of the elements other than oxygen being 100 mol %. Preferably, the content of R is not less than 50 mol % and not more than 80 mol %, the content of Zr is not less than 20 mol % and not more than 50 mol %, and the content of element M is not less than 0 mol % and not more than 20 mol %.

When R contains Pr, the content of Pr is preferably not more than 10 mol %, more preferably not more than 5 mol % of R. In an industrial application, Zr salt may contain a few mol % of Hf, so that the amount of Hf is included in the amount of Zr in the description herein.

When the composite oxide used in the present invention contains M, M may be, for example, one or more elements selected from alkaline earth metals such as Mg, Ca, Sr, and Ba; rare earth elements other than Ce and Pr, such as Sc, Y, La, Nd, or Tb; transition metal elements other than rare earths, such as Ti, V, Nb, Ta, Cr, Mo, W, Mn, Fe, Co, Ni, Pd, Pt, Cu, Ag, Zn, Al, Ga, In, Ge, Sn, and Bi; halogens such as F and Cl; and Si.

The composite oxide used in the present invention has a specific surface area of 11 to 90 $m^2/g$, and the largest peak in the wavelength range of 200 to 800 $cm^{-1}$ of Raman spectrum with a full width at half maximum of 20 to 72 $cm^{-1}$. Preferably, the specific surface area is 12 to 40 $m^2/g$, and the full width at half maximum of the largest peak in the wavelength range of 200 to 800 $cm^{-1}$ of Raman spectrum is 30 to 60 $cm^{-1}$; more preferably the specific surface area is 20 to 40 $m^2/g$, and the full width at half maximum of the largest peak in the wavelength range of 200 to 800 $cm^{-1}$ of Raman spectrum is 30 to 60 $cm^{-1}$. For the capability of the catalyst to constantly maintain the oxidation catalytic capacity under an oxidative atmosphere even when the catalytic metal does not contain or contains only a limited amount of precious metals, it is most preferred that the specific surface area is 20 to 40 $m^2/g$, and the full width at half maximum of the largest peak in the wavelength range of 200 to 800 $cm^{-1}$ of Raman spectrum is 30 to 45 $cm^{-1}$.

As used herein, the specific surface area is determined by the BET method using nitrogen gas adsorption.

As used herein, the full width at half maximum of the largest peak appearing in the wavelength range of 200 to 800 $cm^{-1}$ of Raman spectrum is determined by obtaining a Raman scattering spectrum using NRS-3100 (manufactured by JASCO CORPORATION), the background evaluated through the Gauss function is subtracted, the largest peak is fitted through the Voigt function, and the full width at half maximum is determined.

Figure 2:
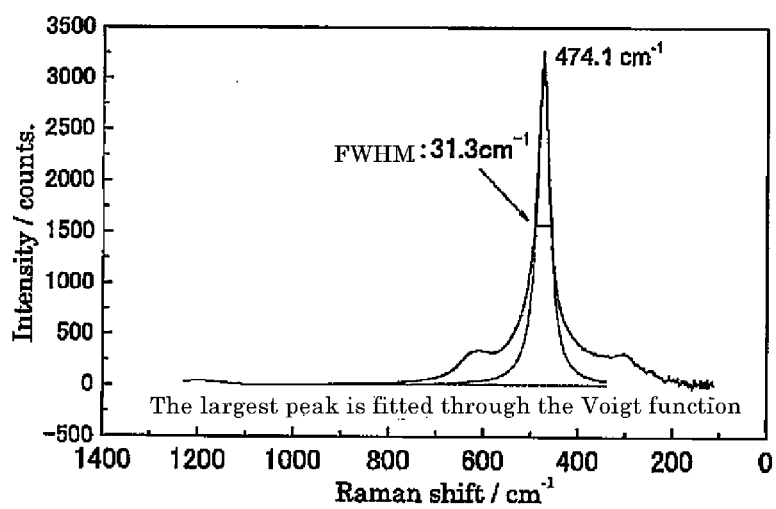
FIG. 2 is a graph for determining the full width at half maximum of the largest peak fitted through the Voigt function, after the background evaluated in FIG. 1 is subtracted.

Specifically, the composite oxide prepared in Example 2 to be discussed later was taken as an example, and the graph showing the Raman scattering spectrum measured of the composite oxide from which the background evaluated through the Gauss function is subtracted is shown in FIG. 1, and the graph obtained by fitting the largest peak through the Voigt function for determination of the full width at half maximum of the largest peak is shown in FIG. 2.

The full width at half maximum of the composite oxide used in the present invention tends to be increased when the composite oxide supporting a catalytic metal is subjected to hydrocarbon steam reforming. Thus, as used herein, the full width at half maximum of the composite oxide is determined before the catalytic metal is supported on the composite oxide. The peak is derived from $CaF_2$ phase or the like phase, and the full width at half maximum of this peak is used for evaluation of crystallinity of the composite oxide in the present invention.

In the present invention, it is generally advantageous that a support of a catalyst has a larger specific surface area. Irrespective of this, the present inventors have found out that higher crystallinity of a composite oxide supporting a catalytic metal results in more effective catalytic performance. In this regard, the present inventors have adopted composite oxides having higher crystallinity with the specific surface area being maintained as large as possible. Such a composite oxide is composed microscopically of two or more very similar $CaF_2$ or the like phases, and it is assumed that good catalytic performance is exhibited due to oxygen tightly taken in at the boundaries of such similar phases and migrated smoothly to thereby reduce the catalytic metal. Two or more very similar $CaF_2$ or the like phases preferably develop when the composite oxide has the above-mentioned composition, specific surface area, and crystallinity, to exhibit good catalytic performance.

In the catalyst of the present invention, at least Ni is supported as the catalytic metal. The catalytic metal may also contain, in addition to Ni, at least one element selected from the group consisting of Cu, Fe, Ru, Pt, Pd, and Rh. The amount of the catalytic metal supported is preferably 0.1 to 10 mol % with respect to the total of R, Zr, and M in the composite oxide being 100 mol %. The catalytic metal is preferably only Ni or Ni and Fe in view of cost and supply, and when the catalytic metal contains elements other than Ni and Fe, their content is preferably not more than the content of Ni and Fe.

The catalyst of the present invention preferably provides a rate of reforming methane to hydrogen of not lower than 40%, preferably not lower than 80%, as determined by heating the catalyst under oxygen flow from the room temperature to 600° C. over 1.5 hours, holding the catalyst at 600° C. for 1 hour, and measuring the methane steam reforming. As determined herein, the methane steam reforming may be determined according to the following conditions.

The determination of methane steam reforming may be started by measuring out 50.0 mg of the catalyst, and fixing the catalyst in a fixed-bed reaction tube (inner diameter 11 mm) made of quartz glass with the upper and lower sides of the catalyst held between quartz glass wool. Then hydrogen is flown into the reaction tube at 100 ml/min, while the tube is heated from the room temperature to 600° C. over 1.5 hours. The tube, when reaches 600° C., is held for 1 hour to reduce the catalyst. After the reduction, the hydrogen gas is stopped, and nitrogen gas is introduced to evacuate the hydrogen gas from the tube. After thorough evacuation of the hydrogen gas, using nitrogen gas as a carrier gas and methane and water at 1:3, nitrogen gas, methane gas, and water steam are introduced into the reaction tube at 90 ml/min, 2.5 ml/min, and 7.5 ml/min, respectively, and measurement of the rate of reforming methane to hydrogen is started. The measurement is made by sampling the outlet gas four times at 13-minute intervals, analyzing each sample gas by gas chromatography, and taking the average. This procedure is referred to as measurement (1).

After measurement (1), oxygen gas is flown into the reaction tube at 100 ml/min, and the tube is held for 1 hour to oxidize the catalyst. Then the oxygen gas is stopped, and nitrogen gas is introduced to evacuate the oxygen gas from the tube. After thorough evacuation of the oxygen gas, the rate of reforming methane to hydrogen is measured in the same way as in measurement (1). This procedure is referred to as measurement (2).

After measurement (2), hydrogen gas is flown into the tube at 100 ml/min, and the tube is held for 1 hour to reduce the catalyst. After the reduction, the hydrogen gas is stopped, and nitrogen gas is introduced to evacuate the hydrogen gas from the tube. After thorough evacuation of the hydrogen gas, the rate of reforming methane to hydrogen is measured in the same way as in measurement (1). This procedure is referred to as measurement (3).

After measurement (3), nitrogen gas is flown into the reaction tube at 90 ml/min while the temperature is lowered to the room temperature. Then, oxygen gas is flown into the tube at 100 ml/min while the temperature is raised from the room temperature up to 600° C. over 1.5 hours. When the temperature reaches 600° C., the tube is held for 1 hour to oxidize the catalyst. After the oxidization, the oxygen gas is stopped, and nitrogen gas is introduced to evacuate the oxygen gas from the tube. After thorough evacuation of the oxygen gas, the rate of reforming methane to hydrogen is measured in the same way as in measurement (1). This procedure is referred to as measurement (4).

After measurement (4), hydrogen gas is flown into the reaction tube at 100 ml/min, and the tube is held for 1 hour to reduce the catalyst. After the reduction, the hydrogen gas is stopped, and nitrogen gas is introduced to evacuate the hydrogen gas from the tube. After thorough evacuation of the hydrogen gas, the rate of reforming methane to hydrogen is measured in the same way as in measurement (1). This procedure is referred to as measurement (5).

The rate of reforming is calculated as follows using the values of methane ($CH_4$), carbon dioxide ($CO_2$), and carbon monoxide (CO) measured in the gas chromatography.

$$\text{Rate of reforming (\%)} = (1 - CH_4/(CH_4 + CO_2 + CO)) \times 100$$

The catalyst according to the present invention may be used as a substitute for a Pt catalyst in PEFC, catalysts for purifying exhaust gases, or the like, and may preferably be used as a hydrocarbon steam reforming catalyst.

The method for producing the catalyst of the present invention is not particularly limited, and may be produced by preparing a precursor through a wet process, heat-treating the precursor to obtain a composite oxide, and making the composite oxide support a catalytic metal through an impregnation method. For example, the catalyst of the present invention may be produced by the method of the present invention.

The method according to the present invention includes step (a) of preparing a mixed solution of a cerium solution not less than 80 mol % of which cerium ions are tetravalent, and zirconium hydroxide.

The tetravalent cerium solution may be, for example, a ceric nitrate solution or an ammonium ceric nitrate solution, with the former being preferred.

The initial concentration of the cerium solution may be adjusted to the cerium content of usually 5 to 100 g/l, preferably 10 to 80 g/l in terms of $CeO_2$. Too low a concentration results in low productivity and is not industrially advantageous.

The average particle size of the zirconium hydroxide is usually 0.5 to 50 μm, preferably 10 to 40 μm. Zirconium hydroxide is a generic name of (A) zirconium hydroxide $Zr(OH)_4 \cdot nH_2O$, (B) zirconium oxyhydroxide, $ZrO(OH)_2 \cdot nH_2O$, and (C) hydrated zirconia $ZrO_2 \cdot nH_2O$, and these may be used alone or as a mixture. The zirconium hydroxide is commercially available usually in the form of powder, or may be obtained by a known method, for example, adding a base, such as aqueous ammonia, ammonia gas, sodium hydroxide, or potassium hydroxide, to an aqueous solution of zirconium salt, such as zirconium nitrate, zirconium chloride, or zirconyl nitrate.

The method according to the present invention includes step (b) of neutralizing the mixed solution obtained in step (a) to obtain a precursor of a composite oxide.

Before step (b), the mixed solution obtained in step (a) may be held under heating to not lower than 60° C. By this holding under heating, cerium oxide hydrate is generated from the cerium solution, and a colloidal solution of a composite salt of zirconium hydroxide and cerium oxide hydrate is formed. A reaction vessel that may be used may either be a sealed or open reaction vessel, and preferably be an autoclave reactor. The temperature of the holding under heating is not lower than 60° C., preferably 60 to 200° C., more preferably 80 to 180° C., most preferably 90 to 130° C. The duration of the holding under heating is usually 10 minutes to 48 hours, preferably 30 minutes to 36 hours, more preferably 1 hour to 24 hours. Without holding under heating under sufficient conditions, the crystallinity of the precursor to be discussed later is not high enough, and the specific surface area and the crystallinity of the eventually resulting composite oxide may not fall within the desired ranges.

In case elements other than Ce and Zr are to be contained, aqueous solutions of such elements may be added at a desired composition before or after the holding under heating. Alternatively, the precursor may be impregnated with aqueous solution of such elements before calcining step (d) to be discussed later, or the precursor may be mixed with salts or oxides of such elements.

In step (b), the neutralization may be carried out by mixing the mixed solution obtained in step (a) with sodium hydroxide, potassium hydroxide, aqueous ammonia, ammonia gas, or a mixture thereof, in particular by adding the colloidal solution of the composite salt obtained by the above-mentioned holding under heating, to aqueous ammonia.

The neutralization may be carried out after the colloidal solution of the composite salt obtained by the above-mentioned holding under heating is cooled.

The precursor may be separated by, for example, Nutsche method, centrifugation, or filter pressing. The obtained precipitate may be washed with water as necessary. The obtained precursor may be dried to an appropriate extent. The drying may be carried out at about 60 to 200° C.

The method according to the present invention includes step (c) of adding a surfactant to the precursor and mixing.

The surfactant may be, for example, anionic surfactant such as ethoxycarboxylate, nonionic surfactant such as alcohol ethoxylate, polyethylene glycol, carboxylic acid, or mixtures thereof, with carboxylic acid being preferred.

The carboxylic acid may preferably be saturated carboxylic acid, such as decanoic, lauric, myristic, or palmitic acid, with lauric acid being particularly preferred.

The amount of the surfactant to be added is usually 1 to 50 parts by mass, preferably 5 to 30 parts by mass, based on 100 parts by mass of the composite oxide to be obtained. With the amount less than the above range, the specific surface area and the crystallinity of the eventually resulting composite oxide may not fall under the desired ranges.

The surfactant may be used as it is in a solid form, or in the form of a solution prepared by diluting or dissolving the surfactant in a solvent such as pure water. The mixing may be carried out in a known mixer.

The method according to the present invention includes step (d) of calcining the precursor mixed with the surfactant to obtain a composite oxide.

Before step (d), the precursor mixed with the surfactant may be pre-baked to obtain a composite oxide. The temperature of the pre-baking is usually 250 to 700° C., preferably 300 to 500° C. The pre-baking may be carried out in the air or oxygen. The duration of the pre-baking may suitably be decided taking the pre-baking temperature into consideration, and may usually be 1 to 10 hours.

The pre-baked composite oxide may be pulverized as necessary before step (d) of calcining. The calcining temperature in step (d) is usually 600 to 1200° C., preferably 800 to 1100° C., most preferably 800 to 1050° C. The calcining may be carried out in the air or oxygen, with oxygen being preferred. The duration of the calcining may suitably be decided taking the calcining temperature into consideration, and may usually be 1 to 10 hours.

The obtained composite oxide may be pulverized into a desired particle size as necessary. For example, when used as a hydrocarbon steam reforming catalyst, the composite oxide preferably has a mean particle diameter of 1 to 50 μm.

The method according to the present invention includes step (e) of making the obtained composite oxide support a catalytic metal containing at least Ni.

In step (e), the catalytic metal may be supported through a known method, for example, by impregnating the composite oxide with an aqueous solution of a catalytic metal, followed by calcining. The calcining temperature is usually 250 to 800° C., preferably 300 to 600° C. The calcination may be carried out in the air or oxygen, with oxygen being preferred. The duration of the calcination may suitably be decided taking the calcining temperature into consideration, and may usually be 1 to 10 hours.

Some of the catalyst according to the present invention may exhibit the catalytic performance as it is after the calcination, but may be subjected to activation treatment such as reduction and/or oxidation as necessary.

EXAMPLES

The present invention will now be explained with reference to Examples and Comparative Examples, which do not intend to limit the present invention.

Example 1

An aqueous solution of cerium nitrate not less than 90% of which cerium ions were tetravalent and zirconium hydroxide having a mean particle diameter of 30 μm were mixed so as to be in a ratio of 75 mol % of Ce and 25 mol % of Zr, to prepare a 1 litter of a mixed solution so as to be at a concentration of 30 g/l in terms of oxides, and the obtained mixed solution was placed in a 1 litter separable flask. The separable flask was equipped with a stirrer and a Dimroth condenser tube, and held under heating at 98° C. for 20 hours. After the holding under heating, the flask was cooled down to the room temperature, and a colloidal solution of cerium-zirconium composite salt was obtained. The solution of the composite salt was added into 415 ml of 12.5% aqueous ammonia under stirring at 50 ml/min to obtain a precursor of a composite oxide in a gel form. The gel was subjected to filtration and washing to obtain a filter cake. To the obtained filter cake, 3 g of ammonium laurate dissolved in pure water was added and mixed. Then the mixture was pre-baked at 400° C. for 5 hours to obtain a composite oxide. The obtained composite oxide was calcined in oxygen at 800° C. for 3 hours, and then measured with ICP to find the composition of 75 mol % of Ce and 25 mol % of Zr.

The composite oxide was found to have the largest peak in the wavelength range of 200 to 800 cm$^{-1}$ of Raman spectrum discussed above with a full width at half maximum of 47.5 cm$^{-1}$, and a specific surface area of 72.8 m$^2$/g. After that, the composite oxide was impregnated with an aqueous solution of nickel nitrate so as to have a composition with the Ni amount of 6.25 mol % with respect to the total of Ce and Zr being 100 mol %, and calcined in oxygen at 500° C. for 3 hours to obtain a catalyst. The obtained composite oxide was analyzed with ICP to find that the Ni content was 6.25 mol % with respect to the total of Ce and Zr being 100 mol %.

The obtained catalyst was subjected to the determination of the methane steam reforming as discussed above. The rate of reforming is shown in Table 1.

Example 2

A composite oxide and a catalyst were obtained in the same way as in Example 1 except that the calcination temperature of the composite oxide was changed from 800° C. to 1000° C. The full width at half maximum of the Raman spectrum and the specific surface area of the obtained composite oxide, and the rate of reforming of the obtained catalyst were determined. The results are shown in Table 1.

Example 3

A composite oxide and a catalyst were obtained in the same way as in Example 2 except that the composition of the composite oxide was 73.2 mo % of Ce, 2.4 mo % of Pr, and 24.4 mol % of Zr, and the composition of the catalyst was 6.25 mol % of Ni with respect to the total of Ce, Pr, and Zr being 100 mol %. An aqueous solution of praseodymium nitrate was used as Pr, and added to the mixed solution of the aqueous solution of cerium nitrate and zirconium hydroxide. The full width at half maximum of the Raman spectrum and the specific surface area of the obtained composite oxide, and the rate of reforming of the obtained catalyst were determined. The results are shown in Table 1.

Example 4

A composite oxide and a catalyst were obtained in the same way as in Example 3 except that the calcination temperature of the composite oxide was changed from 1000° C. to 1100° C. The full width at half maximum of the Raman spectrum and the specific surface area of the obtained composite oxide, and the rate of reforming of the obtained catalyst were determined. The results are shown in Table 1.

Example 5

A composite oxide and a catalyst were obtained in the same way as in Example 1 except that the composition of the composite oxide was 50 mol % of Ce and 50 mol % of Zr. The full width at half maximum of the Raman spectrum and the specific surface area of the obtained composite oxide, and the rate of reforming of the obtained catalyst were determined. The results are shown in Table 1.

Example 6

A composite oxide and a catalyst were obtained in the same way as in Example 5 except that the calcination temperature of the composite oxide was changed from 800° C. to 1000° C. The full width at half maximum of the Raman spectrum and the specific surface area of the obtained composite oxide, and the rate of reforming of the obtained catalyst were determined. The results are shown in Table 1.

Example 7

A composite oxide and a catalyst were obtained in the same way as in Example 3 except that the composition of the composite oxide was 47.6 mol % of Ce, 4.8 mol % of Pr, and 47.6 mol % of Zr. The full width at half maximum of the Raman spectrum and the specific surface area of the obtained composite oxide, and the rate of reforming of the obtained catalyst were determined. The results are shown in Table 1.

Example 8

A composite oxide and a catalyst were obtained in the same way as in Example 3 except that the mixed solution was added to the aqueous ammonia without heating to obtain a precursor, and the calcination temperature of the composite oxide was changed from 1000° C. to 800° C. The full width at half maximum of the Raman spectrum and the specific surface area of the obtained composite oxide, and the rate of reforming of the obtained catalyst were determined. The results are shown in Table 1.

Example 9

A composite oxide and a catalyst were obtained in the same way as in Example 7 except that the composite oxide was impregnated with an aqueous solution of nickel nitrate and an aqueous solution of palladium nitrate so that the Ni amount was 5.94 mol % and the Pd amount was 0.31 mol % with respect to the total of Ce, Pr, and Zr being 100 mol %. The full width at half maximum of the Raman spectrum and the specific surface area of the obtained composite oxide, and the rate of reforming of the obtained catalyst were determined. The results are shown in Table 1.

Comparative Example 1

A composite oxide and a catalyst were obtained in the same way as in Example 8 except that the calcination temperature of the composite oxide was changed from 800° C. to 1000° C. The full width at half maximum of the Raman spectrum and the specific surface area of the obtained composite oxide, and the rate of reforming of the obtained catalyst were determined. The results are shown in Table 1.

Comparative Example 2

A composite oxide and a catalyst were obtained in the same way as in Example 5 except that the calcination temperature of the composite oxide was changed from 800° C. to 600° C. The full width at half maximum of the Raman spectrum and the specific surface area of the obtained composite oxide, and the rate of reforming of the obtained catalyst were determined, provided that measurement (5) was omitted. The results are shown in Table 1.

Comparative Example 3

A composite oxide and a catalyst were obtained in the same way as in Example 7 except that the calcination temperature of the composite oxide was changed from 1000° C. to 600° C. The full width at half maximum of the Raman spectrum and the specific surface area of the obtained composite oxide, and the rate of reforming of the obtained catalyst were determined. The results are shown in Table 1.

Comparative Example 4

A composite oxide and a catalyst were obtained in the same way as in Example 7 except that the calcination temperature of the composite oxide was changed from 1000° C. to 1050° C. The full width at half maximum of the Raman spectrum and the specific surface area of the obtained composite oxide, and the rate of reforming of the obtained catalyst were determined. The results are shown in Table 1.

Comparative Example 5

A composite oxide and a catalyst were obtained in the same way as in Example 3 except that the calcination temperature of the composite oxide was changed from 1000° C. to 1200° C. The full width at half maximum of the Raman spectrum and the specific surface area of the obtained composite oxide, and the rate of reforming of the obtained catalyst were determined. The results are shown in Table 1.

Comparative Example 6

The rate of reforming of a commercially available $Ru/Al_2O_3$ catalyst containing 2 mass % of Ru was measured. The rate of reforming was measured by flowing oxygen gas into the react ion tube at 100 ml/min, raising the temperature from the room temperature up to 600° C. over 1.5 hours, holding the catalyst for 1 hour to oxidize the catalyst, stopping the oxygen gas, introducing nitrogen gas to evacuate the oxygen gas from the reaction tube, and after thorough evacuation of the oxygen gas, measuring the rate of reforming. This procedure omits measurement (1) before measurement (2), so that the result is shown under the column of measurement (2) in Table 1 for the sake of convenience. Then, measurements (3) and (4) were carried out as discussed above. The results are similarly shown under the columns of measurements (3) and (4), respectively, in Table 1 for the sake of convenience.

TABLE 1

|  | BET value m²g⁻¹ | Raman FWHM cm⁻¹ | Rate of reforming | | | | |
|---|---|---|---|---|---|---|---|
|  |  |  | Measurement (1) % | Measurement (2) % | Measurement (3) % | Measurement (4) % | Measurement (5) % |
| Example 1 | 72.8 | 47.5 | 86.6 | 0.0 | 83.1 | 81.5 | 80.8 |
| Example 2 | 23.0 | 31.3 | 84.7 | 80.8 | 81.7 | 81.3 | 81.6 |
| Example 3 | 38.3 | 39.2 | 90.3 | 90.6 | 90.8 | 90.3 | 89.8 |
| Example 4 | 14.3 | 49.8 | 91.4 | 0.0 | 90.3 | 89.1 | 88.2 |
| Example 5 | 84.0 | 70.3 | 81.4 | 0.0 | 76.7 | 68.0 | 72.1 |
| Example 6 | 29.6 | 42.2 | 90.7 | 84.4 | 86.6 | 86.3 | 85.8 |
| Example 7 | 47.8 | 70.5 | 93.6 | 0.0 | 91.5 | 89.9 | 90.6 |
| Example 8 | 44.6 | 51.8 | 64.3 | 0.0 | 51.1 | 48.1 | 35.7 |
| Example 9 | 47.8 | 70.5 | 93.4 | 94.1 | 92.0 | 91.8 | 89.9 |
| Comp. Ex. 1 | 10.6 | 51.2 | 78.3 | 0.0 | 75.8 | 0.0 | — |
| Comp. Ex. 2 | 113.2 | 73.9 | 85.0 | 0.0 | 83.0 | 0.0 | 81.7 |
| Comp. Ex. 3 | 112.3 | 85.2 | 80.8 | 0.0 | 78.6 | 0.0 | 77.8 |
| Comp. Ex. 4 | 31.3 | 72.4 | 86.0 | 0.0 | 85.5 | 0.0 | 84.0 |
| Comp. Ex. 5 | 3.8 | 65.1 | 78.6 | 0.0 | 77.7 | 0.0 | 76.2 |
| Comp. Ex. 6 | — | — | — | 68.9 | 62.8 | 34.5 | — |

What is claimed is:

1. A method for producing a catalyst comprising a catalytic metal comprising at least Ni, supported on a composite oxide, wherein said composite oxide comprises R (R stands for Ce or a mixture of Ce and Pr), Zr, and oxygen, at a composition of not less than 10 mol % and not more than 90 mol % of R, not less than 10 mol % and not more than 90 mol % of Zr, and not less than 0 mol % and not more than 20 mol % of M (M stands for elements other than oxygen, R, and Zr), with respect to a total of said elements other than oxygen being 100 mol %, wherein said composite oxide has a specific surface area of 11 to 90 m²/g, and a largest peak in the wavelength range of 200 to 800 cm⁻¹ of Raman spectrum with a full width at half maximum of 20 to 72 cm⁻¹, said method comprising:
    (a) preparing a mixed solution of a cerium solution not less than 80 mol % of which cerium ions are tetravalent, and zirconium hydroxide,
    (b) neutralizing said mixed solution to obtain a precursor of a composite oxide,
    (c) adding a surfactant to said precursor and mixing,
    (d) calcining said precursor mixed with the surfactant to obtain a composite oxide, and
    (e) making said composite oxide support a catalytic metal comprising at least Ni.

2. The method according to claim 1, wherein said mixed solution in said step (a) contains an aqueous solution of element M.

3. The method according to claim 1, further comprising, after said step (c) and before said step (d), a step of impregnating said precursor mixed with the surfactant with an aqueous solution of element M, or mixing said precursor mixed with the surfactant with a salt or oxide of element M.

4. The method according to claim 1, wherein said calcining in said step (d) is carried out at 800 to 1100° C.

5. The method according to claim 1, further comprising before said step (b), a step of holding under heating said mixed solution obtained in step (a).

* * * * *